May 1, 1962     A. KRAUSZ     3,032,701
STATIC EXCITATION SYSTEM FOR GENERATORS
Filed June 12, 1959
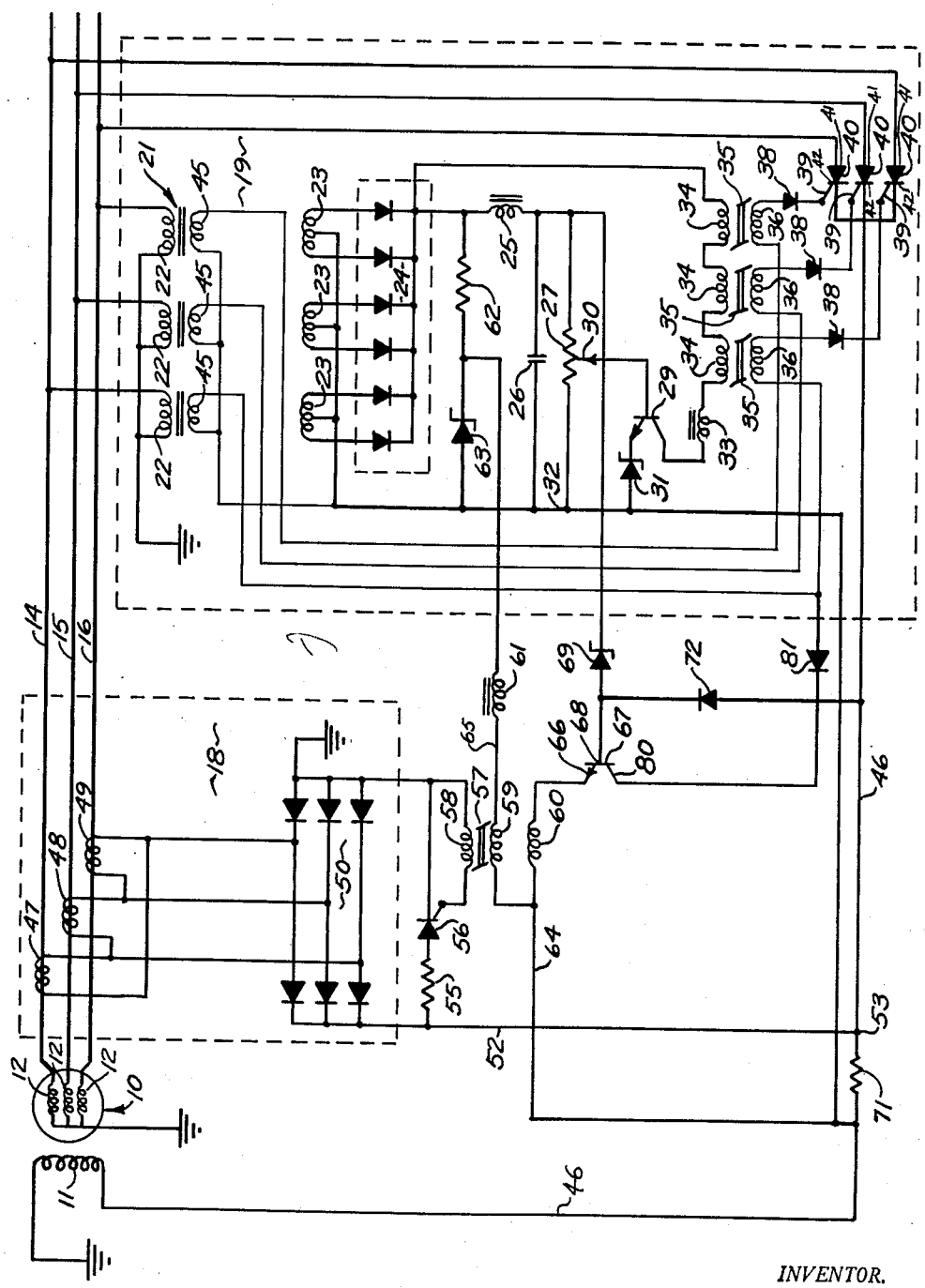
INVENTOR.
ALFRED KRAUSZ
BY Bosworth, Sessions,
Herrstrom + Knowles
ATTORNEYS

United States Patent Office 3,032,701
Patented May 1, 1962

3,032,701
STATIC EXCITATION SYSTEM FOR GENERATORS
Alfred Krausz, Cleveland, Ohio, assignor, by mesne assignments, to The Siegler Corporation, Los Angeles, Calif., a corporation of Delaware
Filed June 12, 1959, Ser. No. 819,847
10 Claims. (Cl. 322—25)

This invention relates to an excitation system for alternating current generators and more particularly to a system for limiting the excitation current in alternating current generators embodying static exciter regulators.

Static exciter systems for alternating current generators embodying current transformers and rectifiers for furnishing a major portion of the excitation and a voltage regulator section for furnishing the balance of the excitation and regulating the excitation current to maintain the output voltage of the generator at a desired value have been proposed. In such systems, however, under some circumstances, such as, for example, a high impedance fault or an excessive load on the generator, the currents flowing in the output conductors of the generator become much larger than normal and the excitation furnished by the current transformers and rectifier becomes excessive. As a result of the high excitation current the torque demanded by the generator from its drive member may be several times the torque required for full rated loading. Calculations have shown that in some instances the maximum torque may become as great as twelve times the torque for rated load. Such high torques imposed on the generator shaft can cause serious damage to the generator driving mechanism. This is particularly true in the case of aircraft installations where a constant speed hydraulic drive mechanism is employed between the aircraft engine and the generator. Excessive torques can destroy the hydraulic drive mechanism and create serious hazards to the aircraft.

In addition, upon the occurrence of a line-to-line fault, the ordinary high phase voltage regulator may be incapable of preventing the generation of an excessively high output voltage in the unfaulted phase. The reason for this is that the heavy currents in the faulted lines cause the current transformers associated with such lines to produce extremely high excitation currents so that excessive excitation is supplied to the generator even though the voltage regulator section is turned off so that it is not supplying any excitation.

The general object of the present invention, therefore, is to provide an excitation system embodying current transformers and having a simple and effective circuit for reducing the excitation current supplied to the field of the generator by the current transformers. Another object is the provision of such an excitation system in which the excitation supplied by the current transformers is reduced in the event that the voltage of the highest phase of the generator output exceeds a predetermined value. Another object is the provision of such an excitation system in which the generator torque is limited to safe values by limiting the excitation current. Other objects include the provision of an excitation system having the above advantages and which is composed of reliable and lightweight static components; and the provision of such an excitation system in which the response to over-excitation or over-voltage is extremely rapid so that damage to the system, either because of an unduly great torque demand on the part of the generator or an unduly high voltage in one of the output lines is prevented.

Other objects and advantages of the invention will become apparent from the following description of a preferred form thereof, reference being made to the accompanying drawing. The essential characteristics of the invention are summarized in the appended claims.

The single FIGURE of the drawing is a wiring diagram of a preferred form of static excitation system embodying my invention.

In the drawing, a preferred form of system is shown in conjunction with a generator indicated in general at 10 and having a field winding 11 and armature or output windings 12 that are connected to the output conductor or buses 14, 15 and 16. In ordinary practice the field winding 11 is on the rotor of the machine while the armature or output windings are stationary. In order to provide excitation to the D.C. field 11, I preferably employ a static exciter system made up of a current section indicated in general at 18 and a voltage section indicated in general at 19. In accordance with usual practice, the major portion of the excitation current is supplied by the current section 18, while a minor portion, sufficient to supply excitation to the generator under no load conditions and sufficient to provide regulation of the generator field under normal operating conditions, is supplied by the voltage section 19.

The voltage section comprises a three-phase transformer 21 having its primaries 22 connected in conventional manner to the output conductors 14, 15 and 16. The secondary windings 23 of the transformer are connected in conventional manner to a full wave rectifier 24. The output of the rectifier 24 is filtered by a network composed of an inductance 25, capacitance 26 and an adjustable resistor 27 having the proper values such that the voltage across load resistor 27 is proportional to the average of the generator phase voltages so long as the phase voltages are nearly balanced, and is proportional to the highest of the individual phase voltages when the unbalance exceeds a predetermined amount. A portion of the voltage across the output resistor 27 is fed to the base of a transistor 29 through the adjustable contact 30 of the output resistor. The transistor emitter is connected through a Zener diode 31 to the point 32 at one end of the load resistor 27. The breakdown voltage of the diode furnishes the reference voltage for the voltage regulator and the regulated voltage is adjustable by means of the contact 30. When the voltage at adjustable contact 30 exceeds the breakdown voltage of diode 31, the base current of the transistor 29 is proportional to the amount that the voltage at contact 30 exceeds the breakdown voltage of the diode. Therefore, the collector current is also proportional to this difference voltage.

The collector of the transistor 29 is connected through a choke 33 and the series connected control windings 34 of magnetic amplifiers 35 to the output of rectifier 24. The output windings 36 of the magnetic amplifiers 35 are connected through diodes or rectifiers 38 to the gates 39 of controlled rectifiers 40, there being one controlled rectifier for each of the output phases of the generator.

The controlled silicon rectifiers are PNPN semi-conductors each having a gate 39, an anode 41, a cathode 42. The rectifiers are normally non-conducting. Avalanche breakdown of the center junction is achieved by applying a signal to the gate, a very brief current pulse of 10 milliamperes at 1½ volts gate-to-cathode being sufficient. The amplitude of the current pulses is not critical, so long as it is sufficient to fire the rectifier. Breakdown occurs at speeds that are almost instantaneous; after breakdown the voltage across the rectifiers is very low. An extremely small amount of power applied at the gate makes it possible to control the switching action of the rectifiers at very high rates of speed. When a rectifier is fired by applying appropriate current to the gate, the rectifier becomes conductive and continues to conduct until the forward voltage is removed; in this respect the device acts much in the manner of a thyratron.

The rectifiers can be made conductive during any part of the positive half cycle of the anode to cathode voltage and remain conductive throughout the remainder of the positive half cycle. Thus, by applying appropriate signal currents at the correct times to the gates 39 of the controlled rectifiers, the rectifiers can be fired to supply excitation current to the generator.

The output windings 36 of the magnetic amplifiers are energized by auxiliary secondaries 45 of the transformer 21, thus the flow of current through the output windings 36 and to the gates 39 of the controlled rectifiers is controlled by the magnetic amplifiers 35 and this in turn is governed by the collector current of transistor 29 in such manner that excitation increases when the generator output voltage decreases and vice versa. This occurs in the following manner: An increase in generator output voltage on lines 14, 15 and 16 causes an increase in the D.C. voltage across filter load resistor 27 and hence an increase in potential at sliding contact 30. This causes an increase in the base current of transistor 29 which in turn results in an increase in collector current through the control windings 34 of the magnetic amplifiers 35. Such an increase delays the instants in the half cycles of a voltage applied to the output windings 36 from auxiliary windings 45 at which current begins to flow in the output windings and hence causes the controlled rectifiers 40 to fire later in the positive half cycle of voltage on anodes 41. It is to be noted that the anode voltage supplied to each of the controlled rectifiers 40 is exactly in phase with the voltage supplied by auxiliary windings 45 to output windings 36. Thus a delay in the instant when voltage is applied to gates 39 causes a proportional delay in anode current through controlled rectifiers 40, and hence results in a reduction in average current supplied to the field through line 46. A reduction in output voltage reduces the voltage at sliding contact 30, reduces the base and collector currents of transistor 29, and advances the firing of magnetic amplifiers 35 and controlled rectifiers 40, thereby increasing the average excitation current supplied to the field by the voltage regulator.

As noted above, in normal operation the voltage regulator section ordinarily is designed to provide a minor portion of the excitation current. The balance of the excitation is supplied by the current section 18 which comprises a current transformer associated with each of the output conductors 14, 15 and 16, the current transformers having secondaries 47, 48 and 49, respectively. The outputs of the current transformer secondaries are connected in conventional manner to a full wave rectifier 50. The output of the rectifier is connected by means of a conductor 52 to the conductor 46 leading to the generator field. Thus the current supplied to the field is the sum of the currents supplied by the voltage section to conductor 46 and the current supplied through conductor 52 to the point 53. With no other controls, the current transformers would supply excitation to the generator in proportion to the flow of current in the conductors 14, 15 and 16. As noted above, under some conditions very heavy currents may flow in the output conductors and with the current transformer-rectifier system and nothing more, excessive excitation would be supplied to the generator resulting in the imposition of extremely heavy torque loads on the generator shaft. Furthermore, under some conditions, such as a line-to-line fault, the current transformers would supply sufficient excitation to produce an unduly high voltage in the unfaulted line even though the voltage regulator functioned to turn off the controlled rectifiers 40 entirely.

In order to protect the system against damage under such circumstances, I connect a shunt circuit made up of an impedance, such as a resistor 55, and a controlled rectifier 56 across the output of the rectifier 50. It will be noted that this circuit is essentially a shunt across the generator field. Thus, if the controlled rectifier 56 is made conductive, the excitation current supplied by the current transformers and rectifier 50 to the field can be reduced by an amount determined by the impedance of the shunt circuit.

The firing of the controlled rectifier 56 is controlled by a saturable pulse transformer 57 which has an output winding 58 in the gate-to-cathode circuit of the rectifier 56, a bias winding 59, and an input or control winding 60. The saturable pulse transformer has a core of square loop material; an output pulse is produced in the output winding whenever the core goes from one state of saturation to the other. Normally, the core 57 is held in a state of negative saturation by the bias winding 59 which is energized by a constant voltage source made up of a Zener diode 63 and a resistor 62, connected across the output of rectifier 24, the other end of the winding 59 being connected through conductors 64 and 46 to the field 11 of the generator. A choke 61 is inserted in the conductor 65 to absorb pulses that may be generated in bias winding 59.

The control winding 60 is connected to the emitter 66 of a transistor 67 at one end and at the other end to conductor 64. In order to make transistor 67 conduct and thus energize control winding 60 to produce output pulses to fire the controlled rectifier 56 when either the field current exceeds the predetermined value or the voltage of the highest phase of the generator output exceeds a predetermined value, I provide a voltage on the base 68 of the transistor sufficient to cause an emitter current which, by flowing through winding 60, overcomes the fixed D.C. bias ampere turns provided by current through winding 59. This base signal is obtained from either or both of the following circuits:

To provide a signal when the voltage of the highest phase exceeds the predetermined value, I apply the voltage across load resistor 27 through breakdown (Zener) diode 69 to the base 68. Base current will flow when the voltage across load resistor 27 is sufficient to overcome the breakdown voltage of diode 69.

In order to limit torque I provide a small resistor 71 in line 46 between point 53 and the field 11. The voltage across resistor 71 is proportional to the total field excitation and is a measure of the generator torque. When the voltage across 71 exceeds the forward breakdown voltage of a diode 72, which is connected between point 53 and base 68 of transistor 67, current will flow to base 68 and provide sufficient emitter current through winding 60 of pulse transformer 57 to overcome the bias ampere turns supplied by winding 59.

In order to make certain that controlled rectifier 56 receives a firing pulse after each turn-off interval, the collector 80 of transistor 67 is supplied from the alternating current voltage developed across one of the auxiliary windings 45 of transformer 21 through diode 81. This circuit insures that the emitter current is not present on alternate half cycles so that pulse transformer 57 is able to return to its initial value of negative saturation through the action of bias winding 59. When the voltage at the collector 80 goes positive an emitter current is able to flow, providing base current exists, and the pulse transformer is properly re-set so that the flow of emitter current can provide a positive pulse to the gate of controlled rectifier 56.

The controlled rectifier 56 is ordinarily turned off after each firing pulse because of the inductive nature of the load supplied by the field and the presence of an impedance such as the resistor 55 in series. With a circuit of the type shown, in which excitation is supplied by the current transformers and by the controlled rectifiers 40 of the voltage section the voltage across the rectifier in a three-phase machine is reduced momentarily to zero every 120° so that the controlled rectifier becomes non-conductive after each time that it is fired, and remains non-conductive until it receives another firing pulse from the pulse transformer 57. Thus, as soon as the abnormal condition is corrected, normal operation of the circuit will be restored.

To summarize the operation, under normal conditions the controlled rectifier 56 remains non-conductive and the amount of excitation is controlled by the voltage section 19 to maintain the output voltage of the machine at the desired level. Under abnormal conditions, such as a three-phase high impedance fault, when excessive current is flowing in the output conductors 14, 15 and 16, the current transformers normally would produce an output great enough to furnish an excessively heavy excitation current. With the present system, however, the voltage drop across small resistor 71 becomes sufficient to overcome the forward drop of diode 72 and supply emitter current to control winding 60, firing the pulse transformer 57 and the controlled rectifier 56. If, for example, a line-to-line fault should occur and the voltage in the unfaulted line should exceed the predetermined voltage as determined by the breakdown diode 69, this diode becomes conductive, also supplying base current to the transistor 67 and sufficient emitter current to the control winding 60 of the saturable pulse transformer to fire the transformer and the controlled rectifier 56. In either case, firing the controlled rectifier closes the circuit through resistor 55 which, as noted above, is in effect, except for the presence of the small resistor 71, a shunt across the generator field. The flow of current through this circuit reduces the excitation current to a safe value and prevents the development of either excessive torque or an excessively high phase voltage, depending upon the nature of the fault.

From the foregoing description of a preferred form of my invention, it will be seen that I have provided a static excitation system for alternating current generators in which the excitation current is reduced automatically to prevent it from exceeding a predetermined level and thereby imposing excessive torque on the generator drive mechanism. Furthermore, the system is responsive to the voltage of the highest phase of the output of the generator and functions to reduce generator excitation if the voltage of the highest phase exceeds a predetermined level. Thus excitation is limited to proper values under fault or other abnormal conditions and the system is protected against damage. Furthermore, the system provides a rapid acting and accurate regulation of the generator voltage. These results are obtained with a relatively simple system made up of reliable and lightweight static components. Thus the system is especially adapted for service in aircraft or other services where fast-acting, reliable and lightweight controls are essential.

Those skilled in the art will appreciate that various changes and modifications can be made in the preferred form of the invention described herein without departing from the spirit and scope of the invention.

I claim:

1. In an excitation system for an alternating current generator having a field winding and output conductors, the combination of a current transformer having a secondary inductively associated with one of said output conductors for providing an alternating current supply proportional to the current in said associated output conductor, rectifier means for rectifying said alternating current supply, circuit means connecting said rectifier means to said field winding for supplying excitation current thereto, means for controlling the amount of said supply to said field winding comprising a series combination of a switching device and an impedance connected in parallel with said field winding and means responsive to conditions in the operation of the generator for controlling said switching device in accordance with said conditions.

2. In a static excitation system for an alternating current generator having a field winding and output conductors, the combination of a current transformer having a secondary inductively associated with one of said output conductors for providing an alternating current supply proportional to the current in said associated output conductor, rectifier means for rectifying said alternating current supply, circuit means connecting said rectifier means to said field winding for supplying excitation current thereto, means for reducing the amount of said supply to said field winding comprising a series combination of a switching device and an impedance connected in parallel with said field winding and means responsive to the excitation current in said field winding for closing said switching device when said excitation current exceeds a predetermined value.

3. In a static excitation system for an alternating current generator having a field winding and output conductors, the combination of a current transformer having a secondary inductively associated with one of said output conductors for providing an alternating current supply proportional to the current in said associated output conductor, rectifier means for rectifying said alternating current supply, circuit means connecting said rectifier means to said field winding for supplying excitation current thereto, means for reducing the amount of said supply to said field winding comprising a series combination of a switching device and an impedance connected in parallel with said field winding and means responsive to the highest phase of the generator output voltage for closing said switching device when said highest phase voltage exceeds a predetermined value.

4. In a static excitation system for an alternating current generator having a field winding and output conductors, the combination of a current transformer having a secondary inductively associated with one of said output conductors for providing an alternating current supply proportional to the current in said associated output conductor, rectifier means for rectifying said alternating current supply, circuit means for connecting said rectifier means to said field winding for supplying excitation current thereto, means for controlling the amount of said supply to said field winding comprising a series combination of a switching device and an impedance connected in parallel with said field winding and means responsive to the excitation current in said field winding and to the output voltage of the generator for controlling said switching device when said excitation current or said output voltage exceeds predetermined values.

5. In a static excitation system for an alternating current generator having a field winding and output conductors, the combination of circuit means connected to one of said output conductors for providing a direct current supply proportional to the current in said associated output conductor, circuit means connected to one of said output conductors for providing a direct current supply inversely proportional to the output voltage of said generator, circuit means connecting said first and said second direct current supply to said field winding for supplying excitation current thereto, means for reducing the excitation current in said field winding comprising the series combination of a switching device and an impedance connected in parallel with said field winding and means for closing said switching device when said excitation current exceeds a predetermined value, and means for closing said switching device when the voltage exceeds a predetermined value.

6. In a static excitation system for an alternating current generator having a field winding and output conductors, the combination of a current transformer having a secondary inductively associated with one of said output conductors for providing an alternating current supply proportional to the current of said associated output conductor, rectifier means for rectifying said alternating current supply, circuit means connected to said output conductors for providing a direct current supply inversely proportional to the output voltage of said generator and including a high phase sensing network, circuit means connecting said first and said second direct current supplies to said field winding for suppling excitation current to said field winding, a shunt circuit for reducing the excitation current in said field winding comprising a controlled rectifier and an impedance connected in series combination across said field winding, means for firing said controlled rectifier when excitation current in said field winding exceeds a predetermined value and when the voltage sensed by said high phase sensing network exceeds a predetermined value.

7. In a static excitation system for an alternating current generator having a field winding and output conductors, the combination of a current transformer having a secondary inductively associated with one of said output conductors for providing an alternating current supply proportional to the current of said associated output conductor, rectifier means for rectifying said alternating current supply, circuit means connected to said output conductors for providing a direct current supply inversely proportional to the output voltage of said generator and including a high phase sensing network, circuit means connecting said first and said second direct current supplies to said field winding for supplying excitation current to said field winding, a shunt circuit for reducing the excitation current in said field winding comprising a controlled rectifier and an impedance connected in series combination across said field winding, a resistance in series with said field winding, and means in circuit with said resistance and responsive to the voltage drop across said resistance for firing said controlled rectifier and closing said switch when the excitation current in said field winding exceeds a predetermined value.

8. In a static excitation system for an alternating current generator having a field winding and output conductors, the combination of current transformers each having a secondary inductively associated with one of said output conductors for providing an alternating current supply, rectifier means connected to the secondaries of said current transformers for rectifying said alternating current supply, circuit means connecting said rectifier means to said field winding for supplying a portion of the excitation current to said field winding, a voltage regulator connected to said output conductors and to said field winding for supplying the balance of the excitation current to said field winding, means for reducing the excitation current in said field winding comprising a controlled rectifier and an impedance connected in series combination across said field winding, a resistor in series with said field winding, means responsive to the voltage drop across said resistor for firing said controlled rectifier comprising a saturable pulse transformer having an output winding connected across the gate-cathode circuit of said controlled rectifier, a bias winding for normally holding the core of said pulse transformer in a statae of saturation and an input winding, and a transistor controlled circuit responsive to the voltage drop across said resistor for energizing said input winding in the event that the current in said field winding exceeds a predetermined value.

9. In a static excitation system for an alternating current generator having a field winding and output conductors, the combination of current transformers each having a secondary inductively associated with one of said output conductors, rectifier means connected to said secondaries for rectifying said alternating current supply, circuit means connecting said rectifier means and said field winding for supplying a portion of the excitation current to said field winding, a voltage regulator means connected between said output conductors and said field winding for furnishing the remainder of the excitation to said generator, said voltage regulator means comprising a controlled rectifier connected to each of said output conductors, a circuit means responsive to the output voltage of the generator for controlling the conduction of the controlled rectifiers so that said controlled rectifiers furnish a direct current supply that is inversely proportional to the output voltage of the generator, circuit means for connecting the output of said controlled rectifiers to said field winding, and means for reducing the field excitation current supplied to said field winding comprising a shunt circuit connected across said field winding, said shunt circuit comprising an impedance and a switching device in series, and means for closing said switching device to cause said shunt circuit to become conductive in response to an excitation current exceeding a predetermined value and in the event that the highest phase of the output of the generator exceeds a predetermined value.

10. In a static excitation system for an alternating current generator having a field winding and output conductors, the combination of current transformers each having a secondary inductively associated with one of said output conductors, rectifier means connected to said secondaries for rectifying said alternating current supply, circuit means connecting said rectifier means to said field winding for supplying a portion of the excitation current to said field winding, voltage regulator means connected between said output conductors and said field winding for furnishing the remainder of the excitation to said generator, said voltage regulator means comprising a controlled rectifier connected to each of said output conductors, a circuit means responsive to the output voltage of the generator for controlling the conduction of the controlled rectifiers so that said controlled rectifiers furnish a direct current supply that is inversely proportional to the output voltage of the generator, circuit means for connecting the output of said controlled rectifiers to said field winding, and means for reducing the field excitation current supplied to said field winding comprising a controlled rectifier and an impedance in series combination connected across said field winding, a resistor in series with said field winding, and means responsive to the voltage drop across said resistor for firing said controlled rectifier comprising a saturable pulse transformer having an output winding connected acoss the gate-cathode circuit of said controlled rectifier, a bias winding for normally holding the core of said pulse transformer in a state of saturation and an input winding, and a transistor controlled circuit responsive to the voltage drop across said resistor for energizing said input winding when the current in said field winding exceeds a predetermined value, and means for firing said controlled rectifier when the highest phase of the generator output voltage exceeds a predetermined value, said firing means comprising a high-phase sensing network in said voltage regulator and circuit means for causing said transistor controlled circuit to conduct and energize said input winding when the highest phase voltage of said generator exceeds a predetermined value.

References Cited in the file of this patent

UNITED STATES PATENTS

| | | |
|---|---|---|
| 1,872,681 | Crago | Aug. 23, 1932 |
| 2,719,259 | Miner | Sept. 27, 1955 |